United States Patent [19]
Conklin et al.

[11] Patent Number: 5,908,086
[45] Date of Patent: Jun. 1, 1999

[54] QUICK DRAIN CRANKCASE DRAIN PLUG

[76] Inventors: Wayne B. Conklin, 512 Retreat Dr., Highland Lakes, N.J. 07422; Ralph Conklin, 16 Cedar St., Bloomingdale, N.J. 07403

[21] Appl. No.: 08/912,422

[22] Filed: Aug. 18, 1997

[51] Int. Cl.⁶ ..................................................... F16C 3/14
[52] U.S. Cl. ........................ 184/1.5; 184/106; 184/105.3; 123/196 R; 403/335; 24/570
[58] Field of Search ........................ 184/1.5, 106, 105.3; 123/196 R; 403/335, 338; 24/570, 571, 615, 625

[56] References Cited

U.S. PATENT DOCUMENTS

| | | | |
|---|---|---|---|
| 903,606 | 11/1908 | Pollock | 251/299 |
| 3,874,478 | 4/1975 | Mantell, Jr. | 184/1.5 |
| 4,361,310 | 11/1982 | Cummins | 184/1.5 |
| 4,512,547 | 4/1985 | Balch | 184/1.5 |
| 4,694,544 | 9/1987 | Chapman | 24/625 |
| 4,756,349 | 7/1988 | Atkins | 184/1.5 |
| 4,970,762 | 11/1990 | Oreck et al. | 24/625 |
| 5,188,495 | 2/1993 | Jones, Jr. | 411/369 |
| 5,379,496 | 1/1995 | Kravss | 24/625 |
| 5,655,280 | 8/1997 | McCommon | 123/196 R |

*Primary Examiner*—John A. Jeffery
*Assistant Examiner*—David Fenstermacher
*Attorney, Agent, or Firm*—Alfred C. Hill

[57] ABSTRACT

A quick drain drain plug to replace the usual solid drain plug of a crankcase of an internal combustion engine includes a first circular member having an axis and a first opening therethrough. A threaded member is secured to and extends perpendicular from one circular surface of the first circular member having a channel therethrough coaxial of the axis in alignment with the first opening, the threaded member being threaded into the threaded oil drain of the crankcase. A valve closure member disposed on the other circular surface of the first circular member has a second opening therethrough coaxial of the axis in alignment with the first opening and the channel. A second circular member having a valve seat therein cooperates with the valve closure member to control draining oil from the crankcase. A first arrangement coupled to the first and second circular members hinges the second circular member to the first circular member to enable the valve seat to engage with and disengage from the valve closure member. A second arrangement releasably connects the second circular member to the first circular member to enable the valve seat to engage the valve closure member to hold oil in the crankcase and to disengage the valve seat from the valve closure member to enable draining oil from the crankcase without using tools.

19 Claims, 2 Drawing Sheets

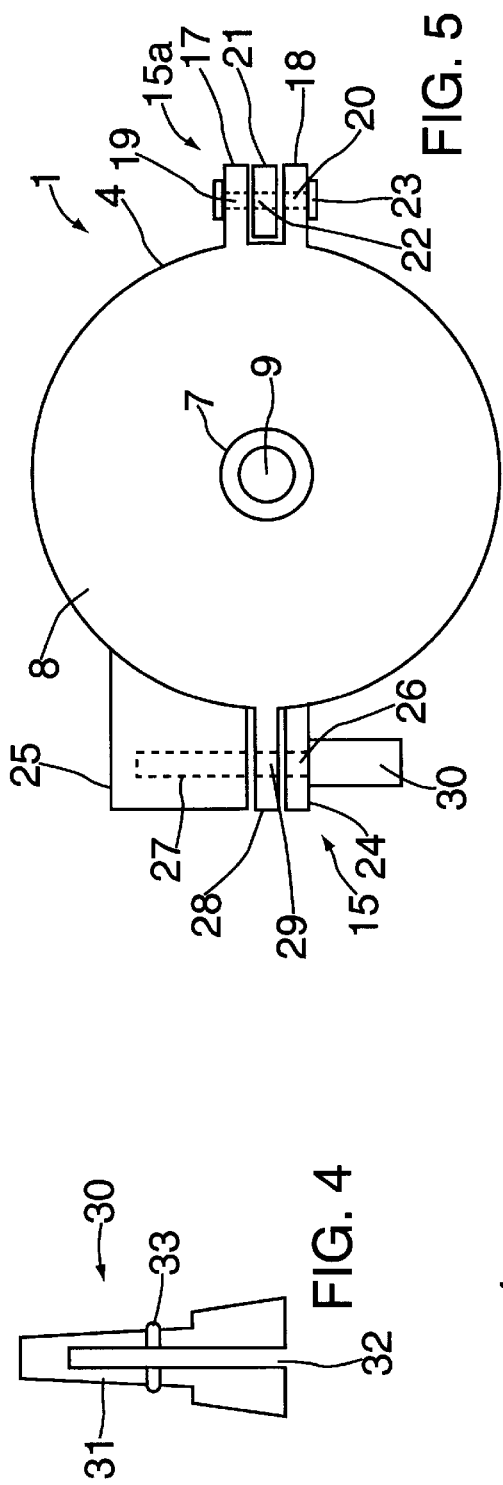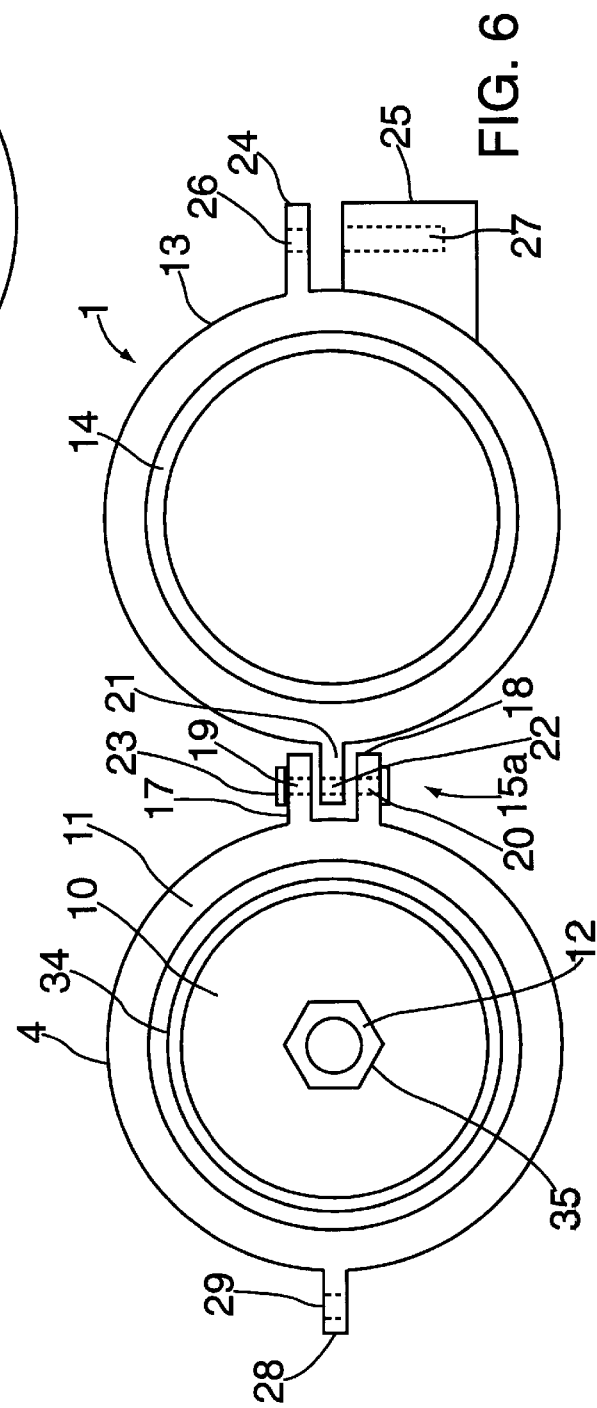

QUICK DRAIN CRANKCASE DRAIN PLUG

BACKGROUND OF THE INVENTION

The present invention relates to manually operable drain valves for liquid containers and in particular to a drain valve assembly for attachment to the threaded drain opening of an internal combustion engine crankcase.

According to conventional practice, oil is drained from an internal combustion crankcase by removing a drain plug and allowing the oil to discharge by gravity flow into a drain pan. This procedure is best carried out with the automobile carrying the internal combustion engine supported overhead on a hydraulic lift, or with the front wheels being disposed on ramps. The drain plug is a male threaded plug having an integral tightening head portion, with the diameter of the tightening head being larger than the plug portion and usually formed in a hexagon configuration for engagement by a wrench. Considerable torque must be applied to tighten or remove the usual drain plug. Anyone who has changed oil in an internal combustion engine will confirm that the drain plug removal procedure usually results in a large amount of oil being splashed onto the wrench, onto the operator's hands and sometimes onto the floor or ground. This situation can be extemely dangerous, especially if the oil is hot.

Moreover, the drain plug will be at the same temperature as the oil, and is thus difficult to handle by hand. The drain plug is small, and if dropped onto a hard surface, its threads can be damaged. It is likewise easy to drop the drain plug into the drain pan or onto the floor where it may roll away and become lost.

An additional problem in handling a conventional drain plug is the risk of cross-threading the plug or over-torquing the plug and stripping the drain hole threads as the plug is reinserted into the crankcase.

It is particularly difficult to remove the drain plug from the crankcase without the use of a hydraulic lift, or some other raising arrangement, since the clearance between the crankcase and the ground level is very small particularly on modern day automobiles. Moreover, in some engine arrangements, the drain plug is in a relatively inaccessible location, which limits the stroke range of back-and-forth manipulations of the wrench required for tightening or loosening the drain plug. It should be appreciated that the job of removing and reinserting the drain plug is complicated in such situations by the fact that the drain plug cannot be seen by the operator unless he is directly underneath it, and in some cases only with the aid of a light which will increase the danger of hot oil splashing upon the operator and burning him.

Known prior art relating to the subject matter of the instant application is shown in the following U.S. Pat. Nos.; 903,606 issued to J. C. Pollock; 3,477,459 issued to G. W. Schossow; 4,361,310 issued to J. W. Cummins and 4,907, 672 issued to H. A. Shirdavani. These prior art patents are directed toward the similar problem, but are much more complicated than the quick drain drain plug of the instant application. Certain of these patents are directed to remotely controlled drain plugs; a drain plug that does not appear to have an arrangement to lock the plug in place other than through the compression between a valve seat and a cork closure member. While another patent is concerned with a very complicated arrangement having a double fastening arrangement to prevent the vibration of the automobile from opening up the drain plug. In each of these prior art arrangements, the valve seat is contained in the plug or part inserted into the crankcase with the valve closure member being provided by the moveable member which is caused to engage the valve seat in the member threaded into the crankcase.

SUMMARY OF THE INVENTION

An object of the present invention is to provide a drain plug that is permanently threaded into an oil drain for a crankcase of an internal combustion engine in place of a usual solid drain plug.

Another object of the present invention is to provide a drain plug that is threaded into a threaded oil drain for a crankcase of an internal combustion engine in place of the usual solid drain plug which may be quickly opened without experiencing the problems of the prior art, or the problems of the conventional way of changing the oil in the crankcase of an internal combustion engine.

A feature of the present invention is the provision of a quick drain drain plug for threading into a threaded oil drain for a crankcase of an internal combustion engine in place of the usual solid drain plug comprising a first circular member having an axis and a first opening therethrough coaxial of the axis; a threaded member secured to and extending perpendicular from one circular surface of the first circular member coaxial of the axis having a channel therethrough coaxial of the axis in alignment with the first opening, the threaded member being threaded into the threaded oil drain of the crankcase to replace the usual solid drain plug; a valve closure member disposed on the other circular surface of the first circular member coaxial of the axis having a second opening therethrough coaxial of the axis in alignment with the first opening and the channel; a second circular member having a valve seat therein to cooperate with the valve closure member to control draining oil from the crankcase; a first arrangement coupled to the first and second circular members to hinge the second circular member to the first circular member to enable the valve seat to engage with and disengage from the valve closure member; and a second arrangement releasably connecting the second circular member to the first circular member to enable the valve seat to engage the valve closure member to hold oil in the crankcase and to disengage the valve seat from the valve closure member to enable draining oil from the crankcase without using tools.

BRIEF DESCRIPTION OF THE DRAWING

Above-mentioned and other features and objects of the present invention will become more apparent by reference to the following description taken in conjunction with the accompanying drawing, in which:

FIG. 4 is an elevational view of the compression pin employed in the embodiment of the present invention as shown in FIG. 2 in accordance with the principles of the present invention;

FIG. 5 is a plan view looking at the top of the quick drain drain plug in accordance with the principles of the present invention in it's closed position; and FIG. 6 is a plan view looking at the bottom of the quick drain drain plug in accordance with the principles of the present invention in open position.

DESCRIPTION OF THE PREFERRED EMBODIMENT

Figure 1:
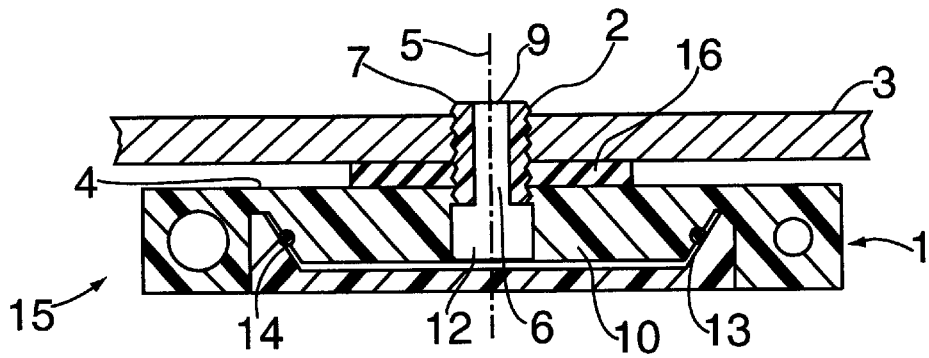
FIG. 1 is a cross-sectional view of the quick drain drain plug in place in a crankcase in accordance with the principles of the present invention with the drain plug in its closed position.

Referring to FIGS. 1–6, the quick drain drain plug 1 is threaded into the threaded oil drain 2 of a crankcase 3 of an internal combustion engine in place of the usual solid drain plug found in most vehicles manufactured today. The drain plug 1 includes a first circular member 4 having an axis 5 and a first opening 6 therethrough coaxial of axis 5. A threaded member 7 is secured to and extending perpendicular from one circular surface 8 of the first circular member 4 coaxial of axis 5 having a channel 9 therethrough coaxial of axis 5 in alignment with the first opening 6. The threaded member 7 is threaded into the threaded oil drain 2 of crankcase 3 to replace the usual solid drain plug. A valve closure member 10 is disposed on the other circular surface 11 of the first circular member 4 coaxial of the axis 5 having a second opening 12 therethrough coaxial of axis 5 in alignment with the first opening 6 and the channel 9. A second circular member 13 having a valve seat 14 therein cooperates with the valve closure member 10 to control draining oil from crankcase 3. A first means 15a is coupled to the first and second circular members 4 and 13 to hinge the second circular member 13 to the first circular member 4 to enable the valve seat 14 to engage with and disengage from the valve closure member 10. A second means 15 releasably connects the second circular member 13 to the first circular member 4 to enable the valve seat 14 to engage the valve closure member 10 to hold oil in the crankcase 3 and to disengage the valve seat 14 from the valve closure member 10 to enable draining oil from the crankcase 3 without using tools.

A gasket 16 is disposed to surround threaded member 7 and is disposed between the bottom of crankcase 3 and the one circular surface 8 of the first circular member 4 to provide a seal between the threaded oil drain 2 and the threaded member 7.

The first means 15a includes first and second members 17 and 18 spaced from each other extending from the first circular member 4 having parallel surfaces disposed at right angles with respect to the one circular surface 8 and the other circular surface 11, each of the first and second spaced members 17 and 18 having aligned apertures 19 and 20 therethrough. A third member 21 extending from the second circular member 13 at right angles with respect thereto is disposed between the first and second spaced members 18 and 19, the third member having an aperture 22 therethrough aligned with the aligned apertures 19 and 20 of the first and second spaced members 17 and 18. A hinge pin 23 extends through the aligned apertures 19, 20, and 22 to enable movement of the second circular member 13 relative to the first circular member 4.

The second means 15 includes fourth and fifth members 24 and 25 spaced from each other extending from the second circular member 13 opposite the third member 21 having parallel surfaces disposed at right angles with respect to the second circular member 13, each of the fourth and fifth spaced members 24 and 25 having aligned apertures 26 and 27 therein. A sixth member 28 extends from the first circular member 4 opposite the first and second spaced members 17 and 18 at right angles with respect to the surfaces 8 and 11 of the first circular member 4 capable of being positioned between the fourth and fifth members 24 and 25 when the valve seat 14 engages the valve closure member 10, the sixth member 28 having an aperture 29 therethrough aligned with the apertures 26 and 27 of the fourth and fifth members 24 and 25. A compression pin 30 is capable of being inserted into the aligned apertures 26, 27, and 29 of the fourth, fifth and sixth members 24, 25, and 28, respectively, to hold the valve seat 14 against the valve closure member 10 and to enable removal of the compression pin by squeezing and pulling the same to enable disengaging the valve seat 14 from the valve closure member 10.

The compression pin 30 includes a tapered pin 31 having a slot 32 therethrough extending longitudinally along the tapered pin 31 from one end thereof to a point short of the other end thereof as best illustrated in FIG. 4. A ridge 33 is disposed on the surface of pin 31 to engage the inner surface of the fourth member 24 when inserted in the aligned apertures 26, 27, and 29 to aid in holding the compression pin 30 in position when the valve arrangement is closed and to prevent the pin 30 from being jarred from the aligned apertures 26, 27, and 29 due to vibration of the internal combustion engine and the vehicle containing the same.

Figure 3:
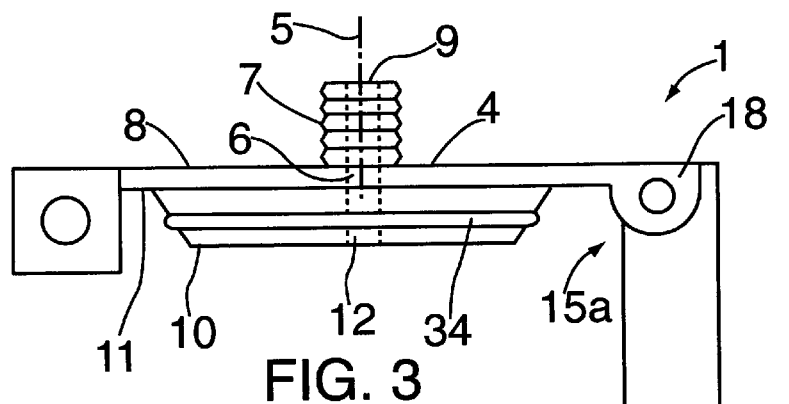
FIG. 3 is an elevational view of the quick drain drain plug in accordance with the principles of the present invention in an open position.
Figure 2:
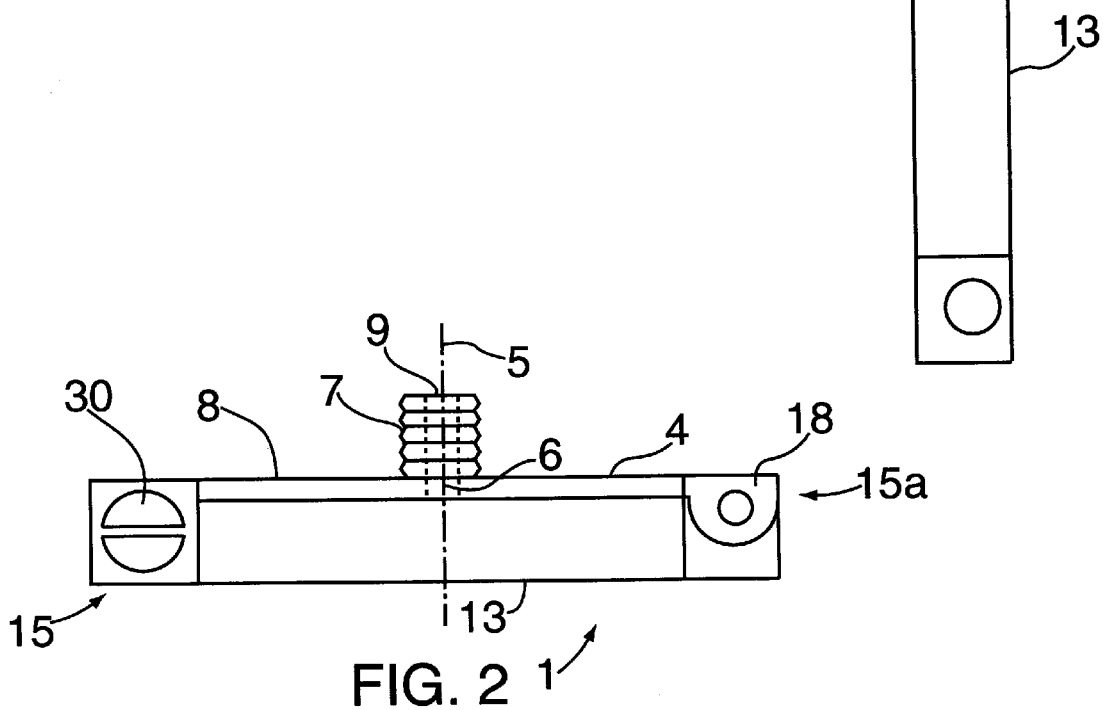
FIG. 2 is an elevational view of the quick drain drain plug in accordance with the principles of the present invention in a closed position.

The valve closure member 10 includes an O-ring 34 as best seen in FIGS. 3 and 6.

The second opening 12 in the valve closure member has a hexagonal configuration as shown at 35 of FIG. 6. This hexagonal configuration 35 enables tightening the threaded member 7 into the threaded oil drain 2 when the quick drain drain plug of the instant application is installed in the crankcase 3.

While we have described above the principles of our invention in connection with specific apparatus, it is to be clearly understood that this description is made only by way of example and not as a limitation to the scope of our invention as set forth in the objects thereof and in the accompanying claims.

We claim:

1. A quick drain drain plug for threading into a threaded oil drain for a crankcase of an internal combustion engine in place of an usual solid drain plug comprising:

a first circular member having an axis and a first opening therethrough coaxial of said axis;

a threaded member secured to and extending perpendicular from one circular surface of said first circular member coaxial of said axis having a channel therethrough coaxial of said axis in alignment with said first opening, said threaded member being threaded into said threaded oil drain of said crankcase to replace said usual solid drain plug;

a valve closure member disposed on the other circular surface of said first circular member coaxial of said axis having a second opening therethrough coaxial of said axis in alignment with said first opening and said channel;

a second circular member having a valve seat therein to cooperate with said valve closure member to control draining oil from said crankcase;

first means coupled to said first and second circular members to hinge said second circular member to said first circular member to enable said valve seat to engage with and disengage from said valve closure member; and second means releasably connecting said second circular member to said first circular member to enable said valve seat to engage said valve closure member to hold oil in said crankcase and to disengage said valve seat from said valve closure member to enable draining oil from said crankcase without using tools.

2. A quick drain drain plug according to claim 1, further including
a gasket surrounding said threaded member and disposed between a bottom of said crankcase and said one circular surface of said first circular member to provide a seal between said threaded oil drain and said threaded member.

3. A quick drain drain plug according to claim 2, wherein said first means includes
first and second members spaced from each other extending from said first circular member having parallel surface disposed at right angles with respect to said one circular surface and said other circular surface, each of said first and second spaced members having aligned apertures therethrough;
a third member extending from said second circular member at right angles with respect thereto disposed between said first and second spaced members, said third member having an aperture therethrough aligned with said aligned apertures of said first and second spaced members; and
a hinge pin extending through said aligned apertures of said first and second spaced members and said third member to enable movement of said second circular member relative to said first circular member.

4. A quick drain drain plug according to claim 3, wherein said second means includes
fourth and fifth members spaced from each other extending from said second circular member opposite said third member having parallel surfaces disposed at right angles with respect to said second circular member, each of said fourth and fifth spaced members having aligned apertures therein;
a sixth member extending from said first circular member opposite said first and second spaced members at right angles with respect to said one and said other of said circular surfaces capable of being positioned between said fourth and fifth members when said valve seat engages said valve closure member, said sixth member having an aperture therethrough aligned with said apertures of said fourth and fifth members; and
a compression pin capable of being inserted into said aligned apertures of said fourth, fifth and sixth members to hold said valve seat against said valve closure member and to enable removal of said compression pin by squeezing and pulling the same to enable disengaging said valve seat from said valve closure member.

5. A quick drain drain plug according to claim 4, wherein said compression pin includes
a tapered pin having a slot therethrough extending longitudinally along said tapered pin from one end thereof to a point short of the other end thereof; and
a ridge disposed on the surface of said tapered pin to engage one of said fourth and fifth members when inserted in said aligned apertures of said fourth, fifth and sixth members.

6. A quick drain drain plug according to claim 5, wherein said valve closure member includes
an O-ring disposed on a surface thereof to engage said valve seat when said valve seat engages said valve closure member.

7. A quick drain drain plug according to claim 6, wherein said second opening has a hexagonal configuration to enable tightening said threaded member in said threaded oil drain when said quick drain drain plug is installed in said crankcase.

8. A quick drain drain plug according to claim 1, wherein said first means includes
first and second members spaced from each other extending from said first circular member having parallel surfaces disposed at right angles with respect to said one circular surface and said other circular surface, each of said first and second spaced members having aligned apertures therethrough;
a third member extending from said second circular member at right angles with respect thereto disposed between said first and second spaced members, said third member having an aperture therethrough aligned with said aligned apertures of said first and second spaced members; and
a hinge pin extending through said aligned apertures of said first and second spaced members and said third member to enable movement of said second circular member relative to said first circular member.

9. A quick drain drain plug according to claim 8, wherein said second means includes
fourth and fifth members spaced from each other extending from said second circular member opposite said third member having parallel surfaces disposed at right angles with respect to said second circular member, each of said fourth and fifth spaced members having aligned apertures therein;
a sixth member extending from said first circular member opposite said first and second spaced members at right angles with respect to said one and said other of said circular surfaces capable of being positioned between said fourth and fifth members when said valve seat engages said valve closure member, said sixth member having an aperture therethrough aligned with said apertures of said fourth and fifth members; and
a compression pin capable of being inserted into said aligned apertures of said fourth, fifth and sixth members to hold said valve seat against said valve closure member and to enable removal of said compression pin by squeezing and pulling the same to enable disengaging said valve seat from said valve closure member.

10. A quick drain drain plug according to claim 9, wherein said compression pin includes
a tapered pin having a slot therethrough extending longitudinally along said tapered pin from one end thereof to a point short of the other end thereof; and
a ridge disposed on the surface of a said tapered pin to engage one of said fourth and fifth members when inserted in said aligned apertures of said fourth, fifth and sixth members.

11. A quick drain drain plug according to claim 10, wherein
said valve closure member includes
an O-ring disposed on a surface thereof to engage said valve seat when said valve seat engages said valve closure member.

12. A quick drain drain plug according to claim 11, wherein
said second opening has a hexagonal configuration to enable tightening said threaded member in said threaded oil drain when said quick drain drain plug is installed in said crankcase.

13. A quick drain drain plug according to claim 1, wherein said second means includes first and second members spaced from each other extending from said second circular member opposite said first means having parallel surfaces disposed at right angles with respect to said second circular member, each of said first and second spaced members having aligned apertures therein;

a third member extending from said first circular member opposite said first means at right angles with respect to said one and said other of said circular surfaces capable of being positioned between said first and second members when said valve seat engages said valve closure member, said third member having an aperture therethrough aligned with said apertures of said first and second members; and a compression pin capable of being inserted into said aligned apertures of said first, second and third members to hold said valve seat against said valve closure member and to enable removal of said compression pin by squeezing and pulling the same to enable disengaging said valve seat from said valve closure member.

14. A quick drain drain plug according to claim 13, wherein said compression pin includes a tapered pin having a slot therethrough extending longitudinally along said tapered pin from one end thereof to a point short of the other end thereof; and a ridge disposed on the surface of said tapered pin to engage one of said first and second members when inserted in said aligned apertures of said first, second and third members.

15. A quick drain drain plug according to claim 14, wherein said valve closure member includes an O-ring disposed on a surface thereof to engage said valve seat when said valve seat engages said valve closure member.

16. A quick drain drain plug according to claim 15, wherein said second opening has a hexagonal configuration to enable tightening said threaded member in said threaded oil drain when said quick drain drain plug is installed in said crankcase.

17. A quick drain drain plug according to claim 1, wherein said valve closure member includes an O-ring disposed on a surface thereof to engage said valve seat when said valve seat engages said valve closure member.

18. A quick drain drain plug according to claim 17, wherein said second opening has a hexagonal configuration to enable tightening said threaded member in said threaded oil drain when said quick drain drain plug is installed in said crankcase.

19. A quick drain drain plug according to claim 1, wherein said second opening has a hexagonal configuration to enable tightening said threaded member in said threaded oil drain when said quick drain drain plug is installed in said crankcase.

\* \* \* \* \*